United States Patent [19]
Dillard et al.

[11] Patent Number: 5,384,825
[45] Date of Patent: Jan. 24, 1995

[54] METHOD FOR MEMORY DIALING FOR CELLULAR TELEPHONES

[75] Inventors: Pamela A. Dillard, Lake Zurich; Alisa C. Chan, Libertyville; Robert K. Krolopp, Chicago, all of Ill.

[73] Assignee: Motorola, Inc., Schaumburg, Ill.

[21] Appl. No.: 86,413

[22] Filed: Jul. 1, 1993

[51] Int. Cl.$^6$ ............... H04M 11/00; H04M 1/64
[52] U.S. Cl. .................................... 379/59; 379/58; 379/88
[58] Field of Search ................ 379/39, 56, 58, 59, 379/61, 62, 88, 354, 355, 356; 370/111; 380/9, 3

[56] References Cited

U.S. PATENT DOCUMENTS

| | | | |
|---|---|---|---|
| 4,039,761 | 8/1977 | Nicoud et al. | |
| 4,342,882 | 8/1982 | Gravenhorst et al. | |
| 4,797,915 | 1/1989 | Bowker et al. | |
| 4,980,910 | 12/1990 | Oba et al. | |
| 4,985,918 | 1/1991 | Tanaka et al. | |
| 5,157,719 | 10/1992 | Waldman | |
| 5,301,227 | 4/1994 | Kamei et al. | 379/88 |
| 5,303,288 | 4/1994 | Duffy et al. | 379/59 |
| 5,305,372 | 4/1994 | Tomiyori | 379/59 |

FOREIGN PATENT DOCUMENTS

| | | | |
|---|---|---|---|
| 3002520 | 2/1993 | WIPO | 379/58 |

OTHER PUBLICATIONS

IBM Corporation, "Cellular Phone with Auto Dialing", IBM Technical Disclosure Bulletin, vol. #36, #8 Aug. 1993.

Cordless Telephone-Alpha-LCR Function, *Tokusengai*, Dec. 1991 (translation).

*Primary Examiner*—Curtis Kuntz
*Assistant Examiner*—William Cumming
*Attorney, Agent, or Firm*—John J. King

[57] ABSTRACT

A unique a method for memory dialing for cellular telephones includes storing a recall sequence having a variable number, and replacing the variable number with a directory number in response to a prompt from the telephone when employing memory dialing. In particular, the method comprises the steps of selecting a memory location in a telephone for designating a recall sequence and storing within the memory location the recall sequence including at least one predetermined number which is automatically dialed by the cellular telephone and at least one variable number to be inserted by the user (59); accessing a memory location (60); responding to a prompt from the telephone (64); and replacing the variable number to complete a calling sequence (66). Finally, the present method provides for the transmission of both data and DTMF tones.

20 Claims, 4 Drawing Sheets

— PRIOR ART —

— PRIOR ART —

METHOD FOR MEMORY DIALING FOR CELLULAR TELEPHONES

FIELD OF THE INVENTION

The present invention is generally related to memory dialing features, and more particularly to variable memory dialing features for cellular telephones.

BACKGROUND OF THE INVENTION

Telephones have included memory dialing features to limit the number of digits required when placing a call. Previously, memory dialing features in telephone devices were limited to dialing predetermined stored numbers which were called frequently. By recalling the directory number which was stored in memory, the number of "keystrokes" required could be significantly reduced. For example, a long distance number comprising ten digits could be dialed by selecting one or two keys on a telephone keyboard.

However, conventional memory dialing has certain limitations. For example, the length of a storing which could be stored in a single memory location, or the amount of total memory space available to store selected numbers is often limited. Further, the number of digits which may be required when making a long distance call is also increasing. For example, when using a credit card number for billing purposes, a large number of digits is required to complete the call in particular, an access code is often required before the director number can be dialed. This access code can commonly include as many as 11 digits. Further, a personal identification number (PIN) may be required to make a connection. Such PINs can also include as many as 11 digits. Finally, control commands may be required for automatic dialing. For example, pauses may be required to be inserted in the sequence to enable automatic dialing.

Presently, some long distance credit card numbers may require as many as 44 digits to complete the call. Such dialing can often be tedious. The user will have to start the dialing process over if an error in dialing has occurred. Further, credit card dialing can be particularly dangerous when a user dials from a cellular telephone while driving a vehicle.

While there have been efforts to reduce the number of digits required in making a long distance call, such efforts have many shortcomings. For example, one system will automatically place a call to the area code of last called number to prevent the user from having to insert the area code each time. However, plating a call to the last called area code will only be beneficial if a single area code is frequently called, or a list of directory numbers in a particular area code must be called. Further, this improvement only reduces the number of digits by three for each call.

Also, in certain cellular telephones manufactured by Oki Electric Industry Company, Ltd. of Japan, a long distance caller may select an automatic credit card calling mode. When the phone is placed in this mode, any calls will automatically be billed to the users credit card number. However, the user is limited to a single credit card. Further, other stored memory locations can only be linked with the credit card information if the stored memory locations include ten digits or less. Finally, the user may inadvertently be in the automatic credit card calling mode. Attempts to make local calls when in the automatic credit card calling mode may result in error and local calls may be billed to the credit card.

Accordingly, there is a need to effectively and conveniently reduce the number of digits required when making calls having a large number of digits. Further, in view of the number of different credit cards available, and the unique calling formats for each of the cards, there is a need to eliminate the requirements for entering credit card numbers with each long distance call. Such a need is heightened by the increased use of cellular telephones in vehicles where the requirement to dial a large number of digits can be dangerous.

SUMMARY OF THE INVENTION

The present invention encompasses a method for memory dialing for cellular telephones including storing a recall sequence having a variable number in a dedicated memory, and providing a number to complete the calling sequence in place of the variable number in response to a prompt from the cellular telephone when employing memory dialing. In particular, the method comprises the steps of selecting a dedicated memory location in a cellular telephone for designating a recall sequence; storing within the memory location the recall sequence including at least one predetermined number which is automatically dialed by the cellular telephone and at least one variable number to be inserted by the user; accessing a memory location for long distance dialing; replacing the variable number with a number to complete a calling sequence in response to a prompt from the cellular telephone; transmitting a portion of the predetermined number on an access channel to establish a connection on the telephone network; establishing a voice channel between the cellular phone and the telephone network; and transmitting the remaining portion of the recall sequence on the voice channel.

One example of a recall sequence could include a predetermined number representing an access code and/or a personal identification number assigned to the user's credit card and a variable number indicating the location in the sequence for a directory number. Accordingly, the only number which needs to be entered when making a credit card call is a directory number at the location of the variable number when prompted by the system.

DESCRIPTION OF THE PREFERRED EMBODIMENT

Figure 1:
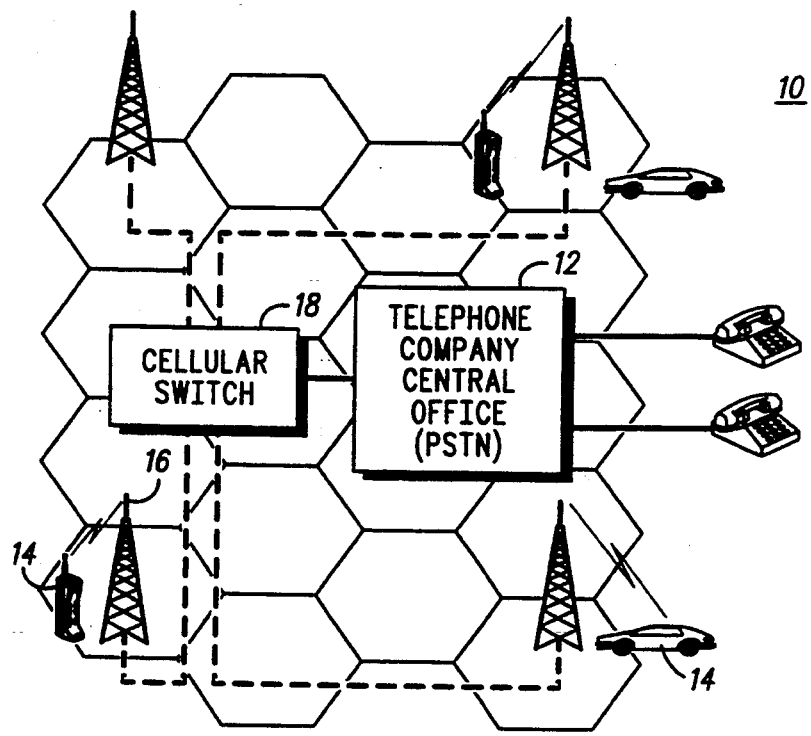
FIG. 1 is a plan view of a conventional cellular telephone network coupled to the telephone network.

The method for memory dialing according to the present invention generally includes an ordered linking of at least one predetermined number and at least one variable number stored in memory for convenient transmission by way of a cellular telephone. FIG. 1 generally shows a cellular network 10 coupled to the public system telephone network 12. In particular, cellular network 10 includes mobile or portable cellular telephones 14 coupled to cellular base stations 16. Each base station 16 is in communication with a cellular switch 18. The cellular switch couples the communication signals to the public system telephone network 12.

Figure 2:
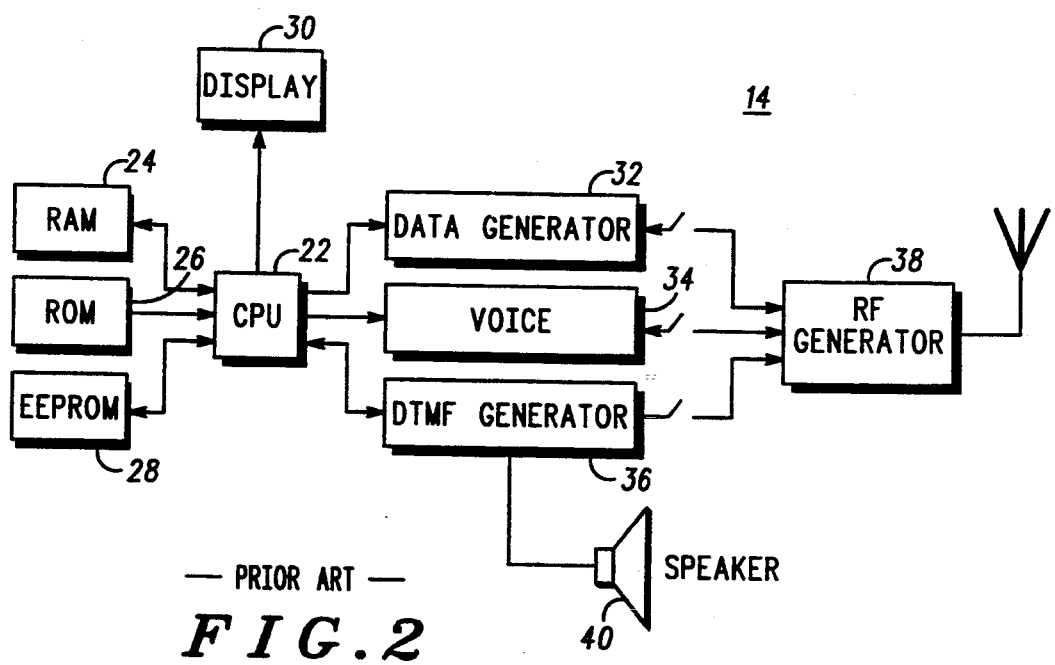
FIG. 2 is a block diagram of a conventional cellular phone.

Turning now to FIG. 2, a block diagram of a conventional cellular telephone 14 is shown. Cellular telephone 14 generally includes a central processing unit (CPU) 22. CPU 22 is coupled to memory devices including a RAM 24, a ROM 26 and an EEPROM 28. CPU 22 is also coupled to a display 30 to display dialing and other information on the cellular phone. Finally, the CPU is coupled to various signal generators including a data generator 32, a voice generator 34, and a dual tone multi-frequency (DTMF) generator 36. Each generator is adapted to be coupled to an RF generator 38 for transmitting and receiving RF signals. The DTMF generator is also coupled to a speaker 40 to output the DTMF signals.

The method for memory dialing for cellular telephones of the present invention as applied to a cellular network will be described in detail in reference to the remaining drawings. The predetermined number(s) and the variable number(s) to be stored in RAM 24 of the cellular phone depend upon the dialing sequence. It will be noted that the method of the present invention could be used in a variety of applications where predetermined numbers are dialed. For example, the method could be used when accessing a credit card number for billing purposes. For credit card dialing, the predetermined numbers could include an access code, a personal identification number (PIN), and any command codes for the proper interface with the public system telephone network (PSTN). Command codes could include, for example, one or more pauses to allow time to make a connection to the PSTN.

Preferably, the method of the present invention will be incorporated in a cellular phone having a display to allow for interaction between the cellular telephone and the user. For convenience, the following description will include reference to function keys which are commonly available on cellular phones. However, the reference to specific functions on cellular phones in describing the present method is merely by way of example. It will be understood that the method of the present invention could be incorporated in other communication systems capable of transmitting digital data within the scope of the present invention.

Figure 3:
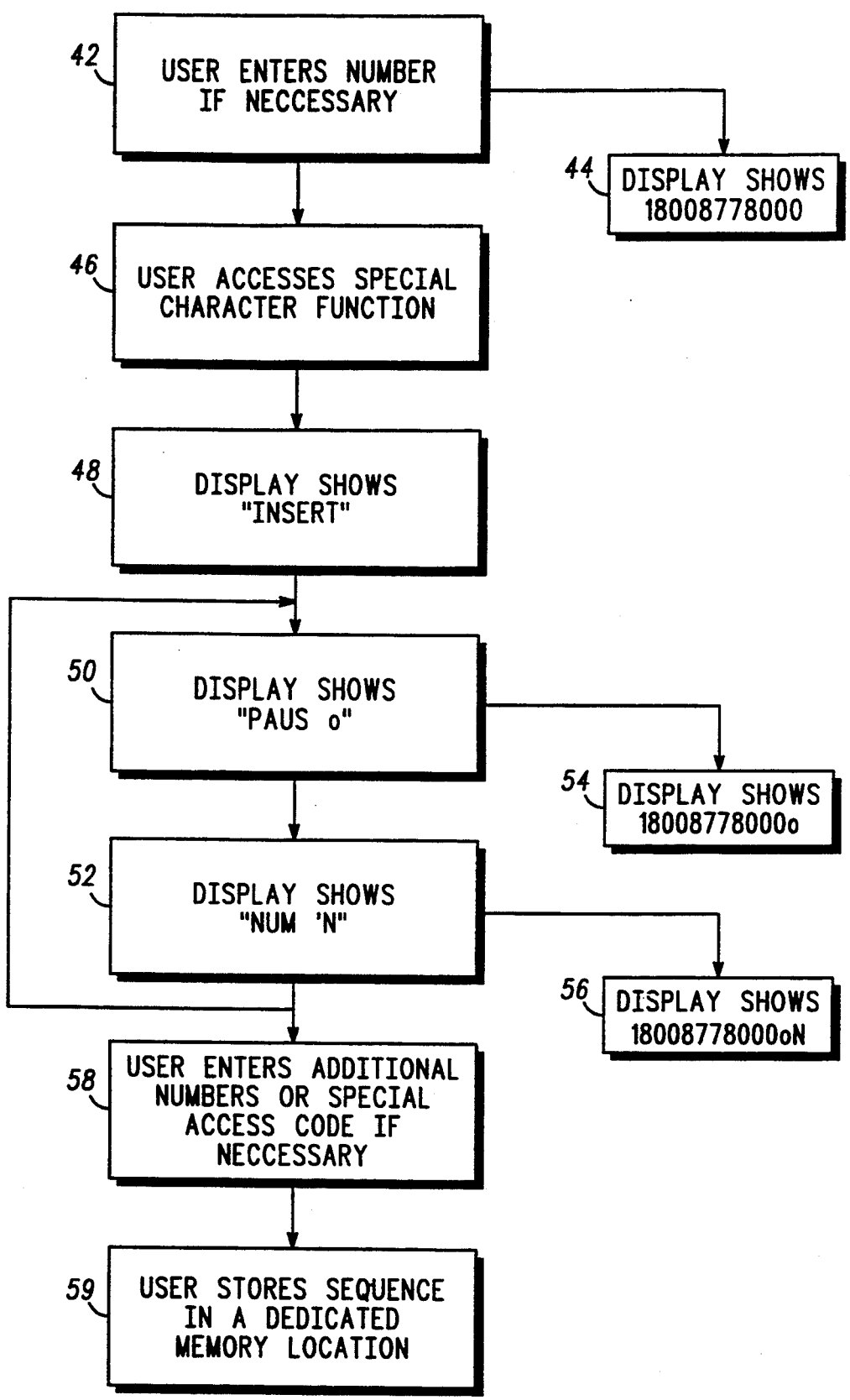
FIG. 3 is a flow chart showing the steps of establishing memory locations having recall sequences which incorporate variable numbers according to the present invention.

Referring to FIG. 3, a flow chart shows the preferred steps for storing a dialing sequence in a memory location according to the method for memory dialing of the present invention. When entering the recall sequence to be stored, the number keys will perform their normal function. Accordingly, the user may enter a number at a step 42, if necessary. Such a number could represent an access code or a personal identification number for credit card dialing. By way of example, an access code "18008778000" which has been entered is shown in the display at a step 44.

The user may then select a key sequence at a step 46 which will allow the user to enter a special character menu. The special character menu will include functions or system prompts which are required for automatic dialing of the dialing sequence. The key sequence to enter the special character menu could include a function (FCN) key and a send (SND) key commonly incorporated in cellular phones. When the sequence (FCN and SND) is entered, the telephone will preferably prompt the user with an "Insert" message on the display at a step 48, and then display the first "special character" available at a step 50.

The method of the present invention could use a variety of special characters stored in the dialing sequence to accomplish memory dialing. The special character could include a variety of system control commands such as pause signals as required in a calling sequence for timing purposes. Different pause signals may be used according to the present invention. For example, pause signals of a predetermined duration could be inserted in strategic location in the recall sequence to enable fully automatic dialing. Alternatively, the pause signals may require a user prompt for the user to continue the calling process. Finally, a certain pause may be used as a prefix to data which is to be transmitted by one of the particular signal generators. For example, one distinct pause may be used as a prefix data to be sent by data generator 32, while a separate distinct pause may be used as a prefix to data to be transmitted by DTMF generator 36 as required for transmitting a call of the cellular network. Another special character could be a variable number N shown at step 52. Variable number N represents the directory number or a portion of a directory number which is to be inserted to complete the call.

Preferably, the * and # buttons on the telephone could be used to scroll up and down between steps 50 and 52, or any additional steps including other special characters such as distinct pause characters. A single pause character in step 50 is shown by way of example. Preferably, the store key (STO) can be used to enter the current special character into the dialing sequence. If the STO key is used to select the pause at step 50, the pause is inserted into the sequence and the resulting display is shown at a step 54, where the pause is represented by "o". However, if a variable number is to be inserted next in the sequence, the # key is used to locate the special character for a variable number N shown at step 52. The special character for a variable number is selected by entering STO, and the resulting display is shown at a step 56. After one of the special characters is selected, other numbers or special characters could be entered as required to complete the recall sequence at step 58. If all numbers and special characters required in the recall sequence are entered, a user stores the recall sequence in a dedicated memory dial location at a step 59 by entering STO.

The dialing sequences is stored as described above with predetermined numbers and one or more variable numbers linkage in an order depending upon the credit card requirements. Numbers can be entered at any time during the sequence by using the number keys. Special characters can also be entered at any time by accessing the special character menu (i.e., entering a predetermined access sequence, such as a FCN and SND key sequence). Finally, the recall sequences can be stored in memory locations which can require a security code to be entered to prevent any unauthorized calls being billed to the credit card.

Figure 4A:
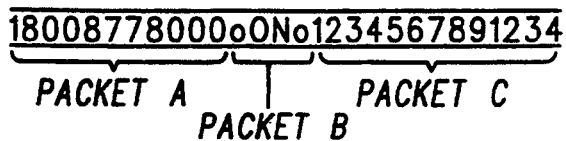
FIG. 4A is an example of a sequence of digits including a location for a variable number which could be stored in a memory location.

An example of a stored dialing sequence is shown in FIG. 4A. The dialing sequence may include a number of packets A, B and C separated by pauses. The packets may contain a variety of information such as an access code, a predetermined area code, a prefix number, or a personal identification number (PIN) required to make a long distance call. The recall sequence shown in FIG. 4A includes by way of example an access code "18008778000" in packet A, a zero (0) followed by a variable number "N" in packet B, and a PIN number "1234567891234" in packet C. As stated earlier, distinct pauses having specific operational functions could be inserted within the sequence. It will be noted that the callers phone number (MIN), an electronic serial number (ESN) or any other data required to make the call from the cellular phone can be sent with a data packet.

Figure 4B:
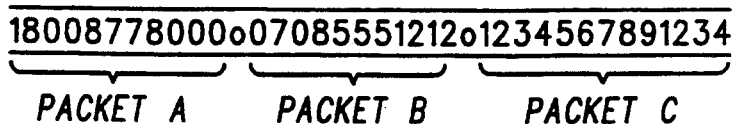
FIG. 4B is an example of a sequence of digits including a directory number entered into the location for the variable number shown in FIG. 4A.

A recall sequence which includes a directory number "7085551212" inserted by the user during dialing operation in place of the variable number N is shown in FIG. 4B. The dialing operation to insert the directory number will be described in detail in reference to FIG. 5.

Finally, it will be noted that the present invention could accommodate memory dialing in a number of other situations other than credit card dialing. For example, the method for memory dialing could be used to dial a pager in a paging system. The predetermined numbers stored in the recall sequence could include the required access codes for the pager and any command codes, while the variable number could represent the pager number. Finally, the method could be used for dialing common area codes and/or common prefixes associated with an area code. Accordingly, only an extension would be required to complete the call.

Figure 5:
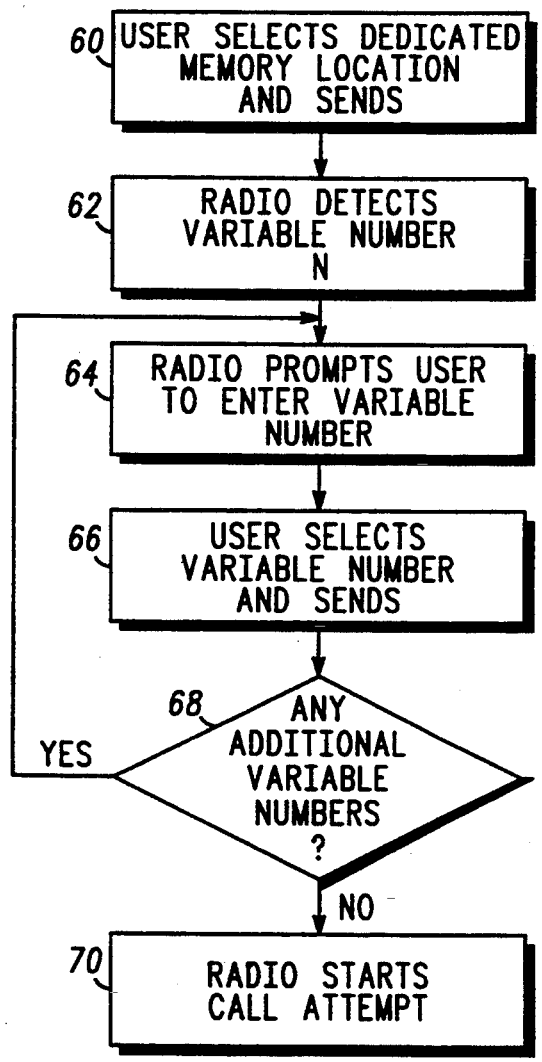
FIG. 5 is a flow chart for the method for memory dialing of the present invention showing the steps of using a system having stored recall sequences incorporating variable numbers.

Turning now to FIG. 5, a flow chart for the method for memory dialing of the present invention shows the steps of using a system having stored recall sequences incorporating variable numbers. In particular, the user selects a dedicated memory location which contains a recall sequence at a step 60. Preferably, the dedicated memory location can be accessed by simply pressing a memory dial key and an associated number as is commonly practiced in cellular telephones. The user will then select the send (SND) function key to start the dialing of the sequence stored in the memory. When the telephone detects the variable number "N" stored in the dialing sequence at a step 62, the telephone prompts the user to insert a number to replace the variable number N at a step 64. The user will insert at a step 66 the desired number, such as a directory number or a pager number, depending on the stored recall sequence. For example, as shown in FIG. 4B, a directory number (708) 555-1212 could be inserted. It will be noted that a directory number could be inserted in place of a variable number by:recalling a directory number from another memory location. For example, the number could be recalled by using common functions such as repertory dialing, last number dialed or call back functions. The use of other memory locations therefore further limits the number of digits to be dialed. In a cellular telephone, the user will then select SND to continue the dialing sequence.

The telephone will continue the dialing sequence and search for any additional variable numbers at a step 68.

If there are additional variable numbers detected, the telephone will again prompt the user to replace the variable number at step 64. If no additional variable numbers are detected in the sequence, the telephone will complete the dialing of any remaining predetermined numbers and start the call attempt at step 70. Preferably, for convenience, the cellular telephone could log and display the amount of calling time billed to each credit card number.

Figure 6:
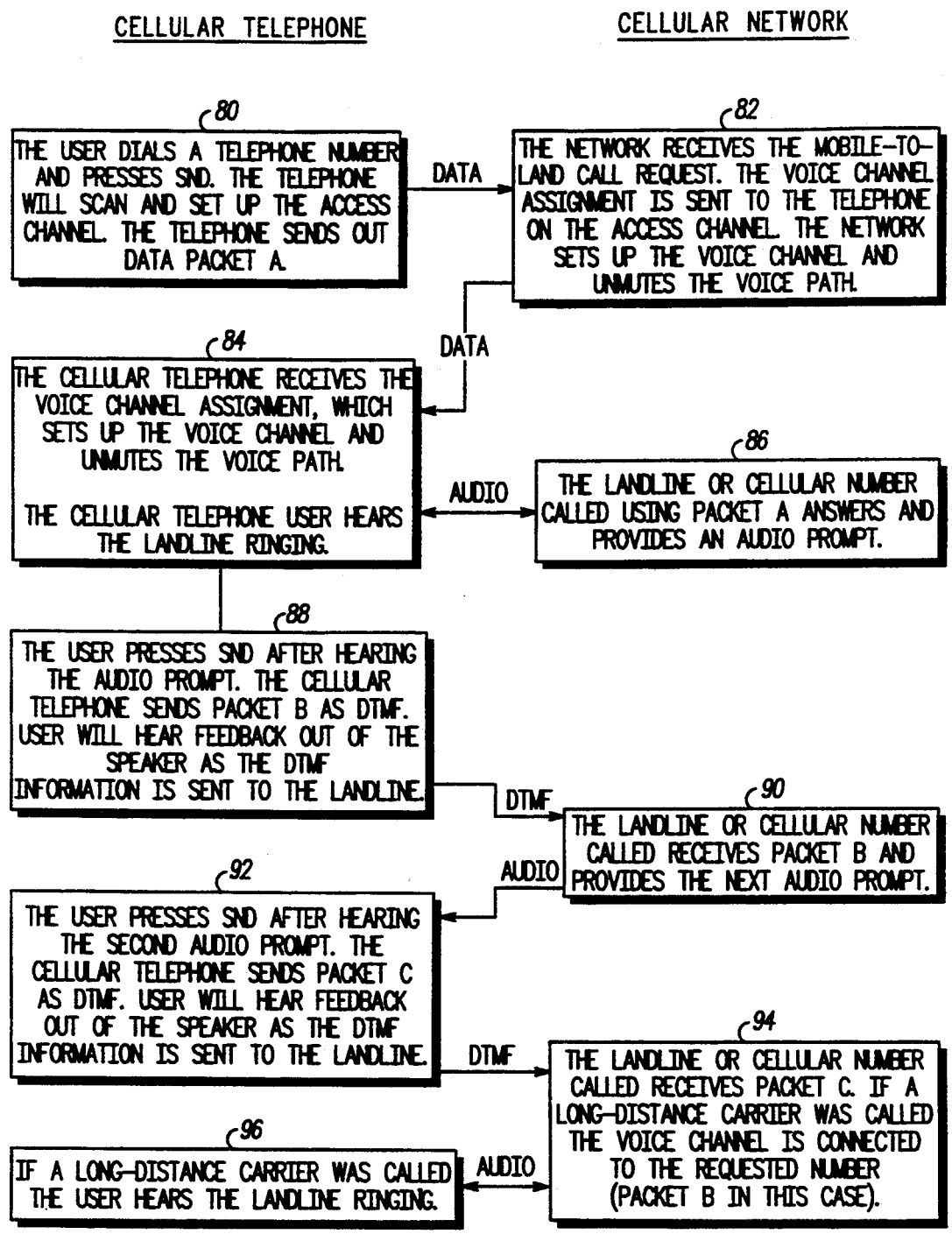
FIG. 6 is a flow chart diagram of the transmission of the recall sequence in the conventional telephone network shown in FIG. 1.

Turning now to FIG. 6, the transmission of the data packets of FIG. 4B in the cellular system is described. In particular, FIG. 6 shows transfers of signals between a cellular phone and another phone coupled a telephone network (i.e. a cellular network or a landline network). Preferably the user replaces the variable number with a directory number in packet B and sends the data (as described above in reference to FIG. 5). The telephone will then scan and set up the access channel at a step 80. The telephone sends out the access digits in packet A on the access channel. Additionally, the number replacing the variable number in packet B could be sent on the access channel depending upon the recall sequence. The network receives the mobile call request and send a voice channel assignment to the telephone on the access channel at a step 82. Generally, transmission of data on the access channel is completed by data generator 32. Accordingly, data packets are transmitted between the cellular telephone and the telephone network to establish a voice channel. Alternatively, the variable number can be replaced with a directory number after the voice channel has been established.

After the cellular telephone receives the voice channel assignment, sets up the voice channel and unmutes the voice path, the cellular telephone user hears the landline ringing at a step 84. The landline number (or other cellular number) called answers and provides an audio prompt at a step 86. Generally, the audio prompt will be provided by the voice generator 34. The cellular telephone then sends packet B as DTMF signals by way of the DTMF generator 36 at a step 88. Any DTMF signals sent by the telephone user can be heard over the external speaker 40. However, packet B could be sent as digital data rather than DTMF. The landline number receives packet B and provides the next audio prompt by way of an audio signal at a step 90.

After heading the next audio prompt, the user transmits packet C as DTMF signals at a step 92 by selecting the SND function. Alteratively, packet C could be transmitted as digital data. Assuming all the required information has been received by at the landline or cellular number, the voice channel is connected to the requested number at a step 94. The user will hear a landline ringing and the call will be connected at a step 96.

In summary, the present invention substantially reduces the number of digits to be dialed when making a long distance call. Such a reduction in the number of digits to be dialed is extremely useful when using a credit card number for dialing. For example, the user can access a variety of different credit cards without having to commit to memory the access codes or personal identification numbers associated with each credit card. Further, a user of a credit card will not have to recall the unique sequence of entering predetermined numbers associated with each credit card. Therefore, the method for memory dialing of the present invention provides flexibility for a user to select which credit card is charged for a long distance call.

Further, the method of the present invention significantly reduces the memory requirement and time for storing frequently called numbers in memory. While it may be possible to store all combinations for all credit cards numbers and all long distance numbers frequently called by the user, such a task would be monumental and would require a large amount of memory. By employing the present method, each credit card number will only have to be stored once. Also, a stored credit card number could be accessed and linked to a long distance number which is already stored in memory to further reduce the number of digits for long distance calling.

Finally, the method of the present invention is adapted to accommodate automatic dialing in a cellular network. Special functions can be stored in the recall sequence to enable automatic dialing. For example, pauses can be inserted at certain locations where required to allow access time to the telephone network. Particularly, distinct pauses can be inserted to accommodate transmission of different types of data, such as digital data or DTMF data.

We claim:

1. A method for memory dialing for cellular telephones comprising the steps of:
   accessing one of a plurality of a dedicated memory locations having stored therein a recall sequence including an ordered linking of at least one predetermined number to be automatically dialed by said cellular telephone and at least one variable number to be inserted by a user;
   replacing said at least one variable number in said recall sequence with a number to complete a dialing sequence in response to a prompt from said cellular telephone;
   transmitting a portion of said recall sequence as data on an access channel to establish a connection to a telephone network;
   establishing a voice channel between said cellular telephone and said telephone network to transmit and receive audio signals; and
   transmitting data signals representing the remaining portion of said recall sequence on said voice channel.

2. The method for memory dialing for cellular telephones of claim 1 wherein said at least one predetermined number is selected from the group consisting of:
   an access number;
   an area code;
   prefix numbers;
   system control commands; and
   a personal identification number.

3. The method for memory dialing for a cellular telephone of claim 1 wherein said recall sequence includes a plurality of predetermined numbers.

4. The method for memory dialing for a cellular telephone of claim 1 wherein said recall sequence includes a plurality of variable numbers and said step of replacing includes replacing a plurality of variable numbers.

5. The method for memory dialing for cellular telephones system of claim 1 wherein said number to complete a dialing sequence is at least a portion of a directory number.

6. The method for memory dialing for cellular telephones of claim 1 wherein said recall sequence includes a pause command delineating said at least one predetermined number and said at least one variable number, said pause command establishing a predetermined delay wherein said recall sequence is continued immediately after said predetermined delay for fully automatic dialing.

7. The method for memory dialing for cellular telephones of claim 1 wherein said recall sequence includes a pause command delineating said at least one predetermined number and said at least one variable number, said pause command establishing a predetermined delay and a user prompt wherein said recall sequence will continue after a response to a user prompt.

8. The method for memory dialing for cellular telephones of claim 1 wherein said recall sequence further includes a first pause command as a prefix to signals which are to be sent as data and a second pause command as a prefix to signals which are to be sent as DTMF tones.

9. The method for memory dialing for cellular telephones of claim 1 wherein said step of transmitting data signals representing the remaining portion of said recall sequence includes transmitting DTMF signals.

10. The method for memory dialing for cellular telephones of claim 1 further including a step of recording the calling time of the call established by said recall sequence.

11. A method for memory dialing for cellular telephones comprising the steps of:
    selecting one of a plurality of dedicated memory locations within said cellular telephone;
    storing within said dedicated memory location a recall sequence including at least one predetermined number to be automatically dialed by said cellular telephone and at least one variable number to be inserted by the user;
    accessing said dedicated memory location;
    replacing said at least one variable number in said recall sequence with a number to complete a dialing sequence in response to a prompt from said cellular telephone;
    transmitting a portion of said recall sequence as data on an access channel to establish a connection to a telephone network;
    establishing a voice channel between said cellular telephone and said telephone network to transmit and receive audio signals; and
    transmitting data signals representing the remaining portion of said recall sequence on said voice channel.

12. The method for memory dialing for cellular telephones of claim 11 wherein said predetermined number is selected from the group consisting of:
    an access number;
    an area code;
    prefix numbers;
    system control commands; and
    a personal identification number.

13. The method for memory dialing for a cellular telephone of claim 11 wherein said recall sequence includes a plurality of predetermined numbers.

14. The method for memory dialing for a cellular telephone of claim 11 wherein said recall sequence includes a plurality of variable numbers and said step of replacing includes replacing a plurality of variable numbers.

15. The method for memory dialing for cellular telephones system of claim 11 wherein said number to complete a dialing sequence is at least a portion of a directory number.

16. The method for memory dialing for cellular telephones of claim 11 wherein said recall sequence includes a pause command delineating said at least one predetermined number and said at least one variable number, said pause command establishing a predetermined delay wherein said recall sequence is continued immediately after said predetermined delay for fully automatic dialing.

17. The method for memory dialing for cellular telephones of claim 11 wherein said recall sequence include a pause command delineating said at least one predetermined number and said at least one variable number, said pause command establishing a predetermined delay and a user prompt wherein said recall sequence will continue after a response to a user prompt.

18. The method for memory dialing for cellular telephones of claim 11 wherein said recall sequence further includes a first pause command as a prefix to signals which are to be sent as data and a second pause command as a prefix to signals which are to be sent as DTMF tones.

19. The method for memory dialing for cellular telephones of claim 11 wherein said step of transmitting data signals representing the remaining portion of said recall sequence includes transmitting DTMF signals.

20. The method for memory dialing for cellular telephones of claim 11 further including a step of recording the calling time of the call established by said recall sequence.

* * * * *